June 23, 1970     L. E. WINDSOR     3,516,387
APPARATUS FOR MANUFACTURING FROST SHIELDS
Filed Aug. 21, 1967     2 Sheets-Sheet 1

INVENTOR
LYNNE E. WINDSOR

June 23, 1970     L. E. WINDSOR     3,516,387

APPARATUS FOR MANUFACTURING FROST SHIELDS

Filed Aug. 21, 1967     2 Sheets-Sheet 2

INVENTOR
LYNNE E. WINDSOR

United States Patent Office 3,516,387
Patented June 23, 1970

3,516,387
APPARATUS FOR MANUFACTURING FROST SHIELDS
Lynnne E. Windsor, Winnipeg, Manitoba, Canada, assignor to James B. Carter Ltd., Winnipeg, Manitoba, Canada
Filed Aug. 21, 1967, Ser. No. 667,314
Int. Cl. B05c 1/08
U.S. Cl. 118—238                                    4 Claims

ABSTRACT OF THE DISCLOSURE

The invention consists of a vacuum operated platen mould upon which a sheet of plastic is placed and is then heated so that the vacuum forms the frost shield. The vacuum holds the plastic frost shield in its position while the perimetrical edges of the frost shield move relative to an adhesive carrying roller. Rack and gear connection between the roller and the platen carrying the frost shield is such that the rotational speed of the roller equals the lineal speed of the frost shield thus preventing skipping.

---

The invention relates to new and useful improvements in the manufacture of frost shields normally used on the interior of car windows or the like during cold weather.

These frost shields are normally formed from clear plastic with a perimetrical edge and a raised planar central portion together with a pair of spacers formed in the raised portion which maintain the raised portion away from the window glass when the shield is installed, it being understood that the perimetrical edges are supplied with adhesive or alternatively, with an attaching strip which in turn is secured adhesively to the shield and to the window glass.

The present device includes two embodiments. Firstly, apparatus for applying a film of adhesive to the perimetrical edge of the formed shield and secondly, a similar device but incorporating means whereby the shield is heat formed and then the adhesive is supplied to the perimetrical edge.

The object of the invention is to provide a device of the character herewithin described which enables frost shields to be formed and the adhesive to be applied thereto, readily and easily.

Another object of the invention is to provide a device of the character herewithin described in which a primer is first applied to the perimetrical edge followed by the layer of adhesive.

Another object of the invention is to provide a device of the character herewithin described which enables frost shields to be manufactured completely in one machine.

A yet further object of the invention is to provide a device of the character herewithin described in which relative movement of an adhesive carrying roller and the frost shield is utilized to coat the perimetrical edge of the frost shield with adhesive. Furthermore, synchronization is obtained between the surface speed of the roller and the lineal movement of the frost shield.

A yet further object of the invention is to provide a device of the character herewithin described which is particularly suitable for mass production inasmuch as the preferred embodiment enables several platen moulds to be utilized on the machine.

With the foregoing considerations in view, and such other objects, purposes or advantages as may become apparent from consideration of this enclosure and specification, the present invention consists of the inventive concept which embraces or includes the construction, arrangment of parts, as herein particularly exemplified in one or more specific embodiments of such concept, reference being had to the accompanying figures in which.

In the drawings like characters of reference indicate corresponding parts in the different figures.

Figure 1:
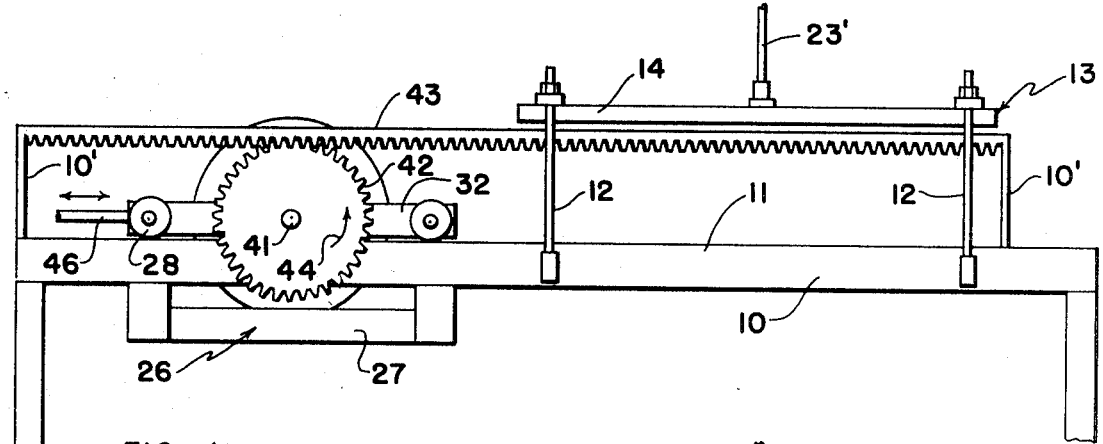
FIG. 1 is a side elevation showing the first embodiment of my device.
Figure 2:
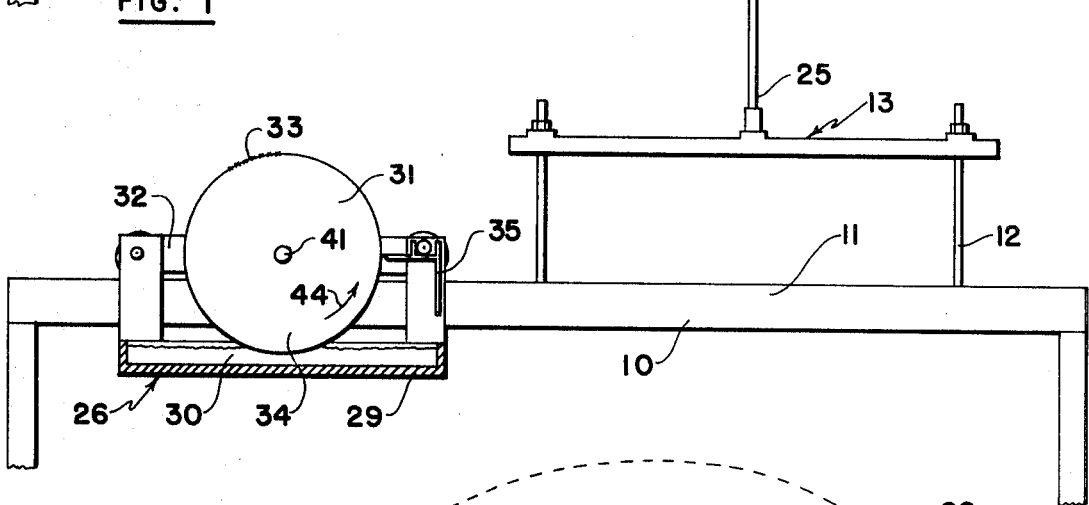
FIG. 2 is a view similar to FIG. 1, but with parts removed to show the interior thereof.

Proceeding first to describe the first embodiment, reference character 10 illustrates supporting framework which includes a pair of spaced and parallel longitudinal guide members 11.

Platen supports 12 extend upwardly from the supporting structure and carry the platen assembly collectively designated 13.

Figure 5:
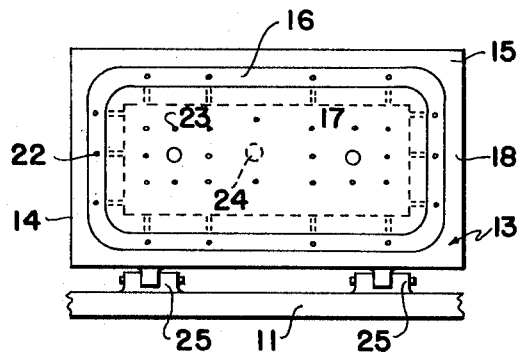
FIG. 5 is a fragmentary partial view showing the platen in the raised position.

This platen assembly consists of a substantially rectangular block 14, the underside of which is shown in FIG. 5.

Figure 7:
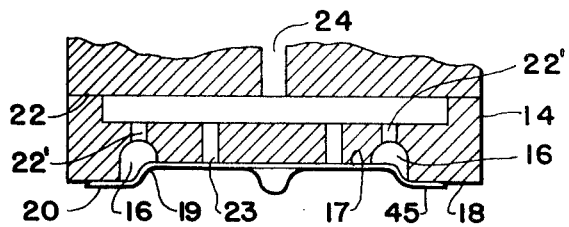
FIG. 7 is an enlarged fragmentary section of the platen with a frost shield held thereon.
Figure 9:
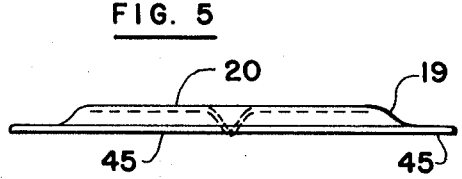
FIG. 9 is an end view of a typical frost shield.

The planar underside surface 15 is provided with a perimetrical groove 16 and a central area 17, the plane of which is above the plane of the boundary area 18, which receives the shoulder 19 of the frost shield 20 (see FIGS. 7 and 9).

A manifold is formed within the upper surface 22 of the platen block 14 and drillings 22' extend to the groove 16, and further drillings 23 extend from the manifold to the area 17.

A vacuum line 23' connects to an intake 24 communicating with the manifold 21. It will therefore be seen that if vacuum is applied to the manifold 21, the frost shield 20 is held in position upon the underside of the platen by means of this vacuum.

It is desirable to hinge the platen by hinges 25 to one longitudinal member 11 so that it can be raised to the vertical position which assists in the placing of the shield upon the platen.

An adhesive assembly collectively designated 26 is adapted to move longitudinally upon the longitudinal members 11 and consist of a sub frame 27, and supporting rollers 28 which engage the upper surfaces of the members 11 thus enabling the carriage to move therealong. This carriage contains a trough 29 carrying an adhesive in liquid form 30 and an adhesive carrying roller 31 is journalled for rotation within the members 32 of the carriage, said roller being situated horizontally and extending between the member 11, journalled upon shaft 41.

It is preferable that the surface of this roller be knurled as indicated schematically by reference character 33 and the lower side 34 of the roller passes through the adhesive 30 and carried in trough 29.

A doctor blade 35 is provided to control the amount of adhesive picked up by roller 31 and this consists of a horizontal blade member 36 situated adjacent the surface of roller 31 and adjustable with relation to the surface by means of eccentric mounting 37 running between vertical members 38 extending upwardly from blade 36. A vertical member 39 extends downwardly and pivots the doctor blade assembly upon pivot pin 40. Therefore, by rotating the eccentric mounting 37, the doctor blade may be moved with reference to the surface of the roller 31.

Secured to the spindle or shaft 41 mounting the roller for rotation within the carriage 26, is a gear 42, it being understood that there is one gear upon each end of the roller shaft or spindle 41.

The teeth of this gear engage longitudinally extending bars 43 which are supported above the frame 10 by convenient means such as supports 10'. It will therefore be seen that if the carriage is moved to the right with reference to FIG. 1, the gear teeth engaging the racks 43, cause the roller 31 to rotate in the direction of arrow 44. The underside of the platen is positioned so that the surface of the roller carrying the adhesive engages the perimetrical flange portions 45 of the frost shield being held upon the underside of the platen, and it is essential that the gear ratio between the gears 42 and the racks 43 be such that the speed of the surface of the roller 31 causes the roller to roll across the flanges 45 of the frost shield without slippage or skipping occurring. The knurlings 33 hereinbefore referred to enable a more even coat of adhesive to be applied that is normally impossible with a smooth surface.

In other words, the surface speed of the roller is synchronized with the lineal speed of the perimetrical edges of the frost shield.

In the operation of this embodiment, the platen assembly or plate 13 is placed in the position shown in FIG. 5, the frost shield 20 is placed in position and held by vacuum, whereupon the platen is lowered. The carriage 26 is then moved rightwardly with reference to FIG. 1 thus passing the roller 31 under the platen and depositing a film of adhesive around the perimetrical flange or edge 45 of the frost shield. The platen is then hinged upwardly and the frost shield removed whereupon the carriage may be returned to the position shown in FIG. 1. Any means may be employed to move the carriage 26 and reference character 46 illustrates the piston rod of a hydraulic or pneumatic piston and cylinder assembly for accomplishing this motion.

Figure 4:
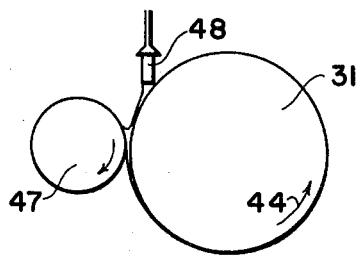
FIG. 4 is a schematic view showing an alternative method of applying adhesive to the adhesive roller.
Figure 3:
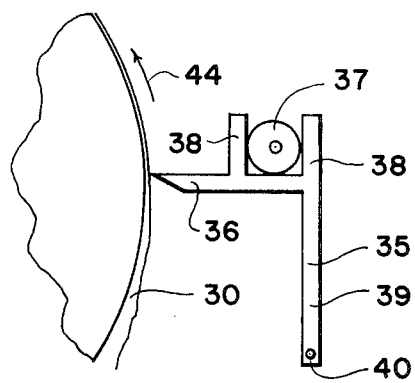
FIG. 3 is an enlarged fragmentary view showing the adjustment of the doctor blade.

FIG. 4 shows an alternative method of supplying adhesive to roller 31 which consists of a transfer roller 47 and an adhesive feed 48 feeding by gravity or pressure between the rollers 47 and 31.

Figure 6:
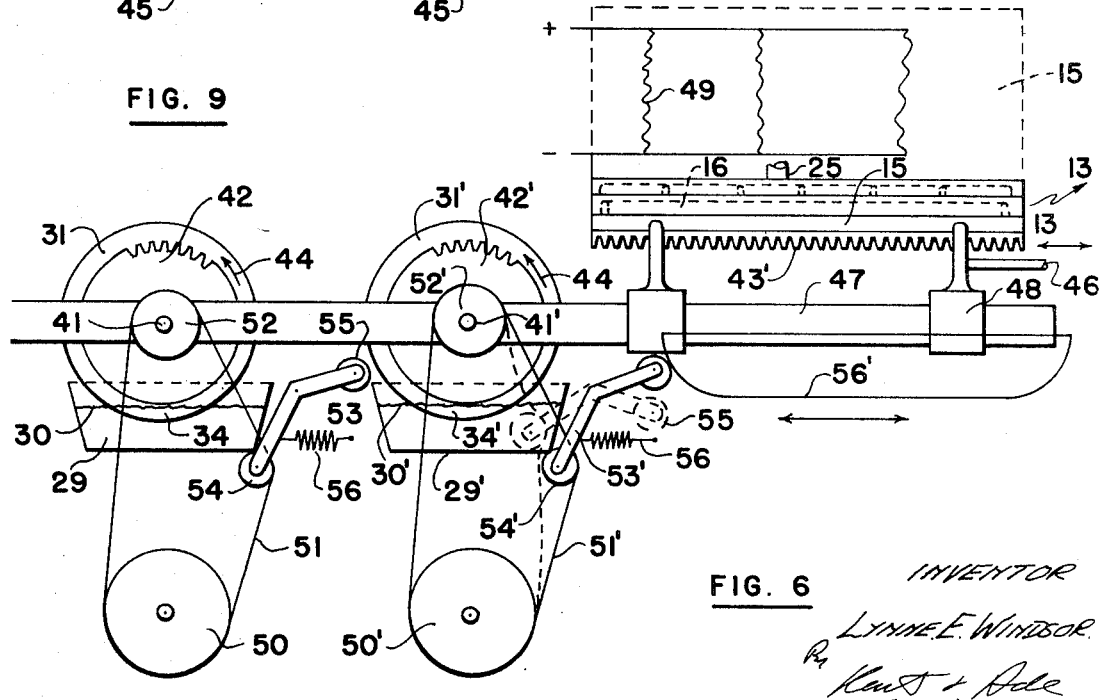
FIG. 6 is a fragmentary side elevation partially schematic showing a further embodiment in which the platen carriage moves rather than the adhesive wheel carriage.

In the further embodiment illustrated in FIG. 6, I prefer to move the platen assembly over the adhesive depositing rollers, it being understood that relative motion between the roller and the frost shield can include the movement of the roller under the frost shield, the movement of the frost shield across the roller, or a combination of the two. The platen assembly is similar to that described previously and illustrated in FIG. 5 and therefore similar reference characters have been used.

The platen assembly is mounted upon a pair of spaced and parallel cylindrical rods or slides 47', one only of which is preferable to utilize two rollers 31 and 31', roller 31 depositing a primer upon the flange 45 just prior to roller 31' applying the adhesive. This enhances the deposition of the adhesive and prevents skipped areas or beading from occurring.

However, both assemblies are identical and therefore similar reference characters have been supplied, one set being primed.

In this embodiment, the adhesive assembly is stationary and mounted between the rails or rods 47 by convenient supporting structure (not illustrated).

It consists of the roller 31, the lower portion 34 of which engages the liquid adhesive 30 contained within pan 29.

Gear wheels 42 are mounted upon the spindles 41 carrying the roller 31 and a relatively short length of rack bar 43' is secured to the sides of the platen assembly 13.

The platen assembly is provided with four sheaves or bearings 48, two of which are shown, said bearings engaging around the guides 47 thus mounting the platen assembly 13 for sliding movement along the guides.

The platen assembly can be moved by means similar to means 46 described in the previous embodiment.

This embodiment is preferable because it enables the frost shield to be manufactured in position upon the platen which may then be passed across the roller 31' thus priming the edges 45 and then across roller 31 which supplies the adhesive.

The frost shield may be formed upon the platen mould by placing a planar sheet of clear plastic upon the underside of the platen and holding same by means of vacuum as hereinbefore described.

A source of radiant heat shown schematically as at 49 is then operated and this, together with the vacuum being applied to the back of the plastic sheet, causes the plastic sheet to form the frost shield 20.

The platen is then hinged downwardly to the horizontal position shown in FIG. 6 and moved across the rollers as hereinbefore described.

As the platen assembly approaches the rollers, the racks 43' engage the gears 42' and 42 thus synchronizing the surface rotation speed of the rollers with the lineal speed of the platen assembly so that an even film of primer and then adhesive is supplied without skipping occurring.

It is desirable to provide means for rotating the rollers 31 and 31' when the platen assembly is not being passed thereover. This is necessary in order to prevent adhesive buildups which occur when rollers stop and start. This rotation is supplied via a source of power (not illustrated) and one method, which is purely illustrative, is shown in FIG. 6. The source of power drives pulley 50 and belt 51 extends around this pulley and around a further pulley 52 secured to spindle 41.

It is of course necessary to over-ride this source of rotation when racks 43' engage gears 42 so that the necessary synchronization of the surface of the roller and the flanges 45 of the frost shield may be obtained. One method which is illustrative only is shown in FIG. 6 and consists of a belt tightener crank 53 having belt tightener pulley 54 mounted on one end thereof and engaging belt 51.

A roller 55 is secured upon the opposite end of the crank 53 and is engageable by a ramp 56' secured to the platen assembly 13. Tension spring 56 normally engages pulley 54 with the belt thus providing drive to the roller 31, but as the platen assembly approaches the roller, and just prior to the engagement of racks 43' with the gears 42, the ramp causes the crank to pivot to the position shown in phantom in FIG. 6 thus slackening the belt and enabling the rack to take over the drive. As soon as the platen assembly has passed the rollers, the spring 56 returns the pulley crank to the solid line position shown in FIG. 6, thus taking up the drive from pulley 50.

Form the foregoing it will be seen that the frost shield can be formed upon the platen which then can be hinged downwardly and passed firstly over the priming roller 31' and then over the adhesive roller 31 whereupon the finished frost shield can be removed.

Figure 8:
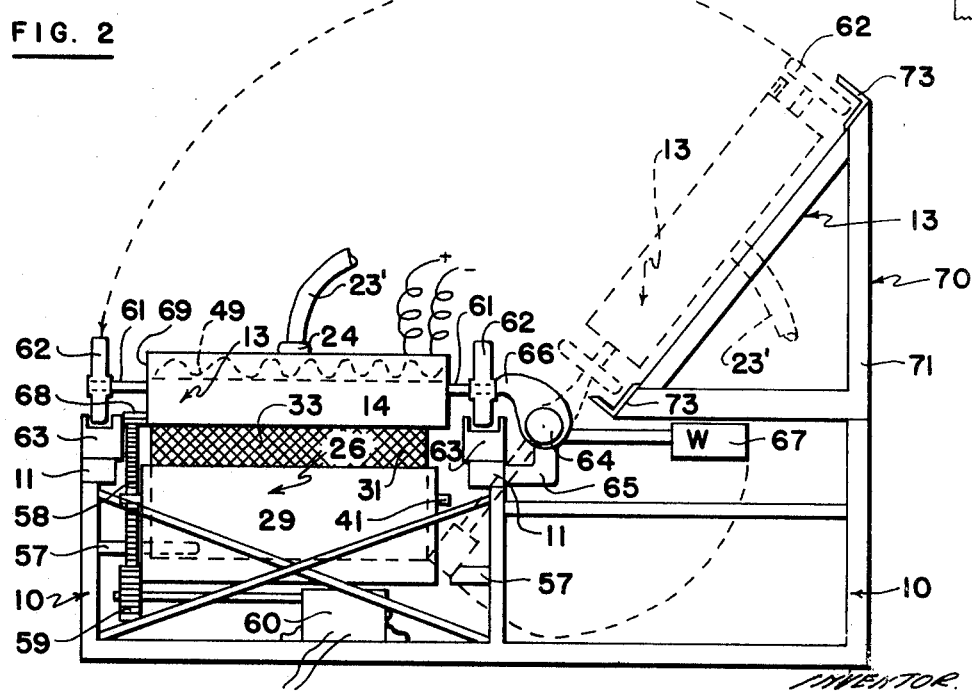
FIG. 8 is an end view of the preferred embodiment of my device.

The preferred embodiment is shown in FIG. 8 and where similar structure is shown, similar reference characters have been utilized.

The supporting structure 10 includes a pair of longitudinally extending spaced and parallel members 11, a platen assembly collectively designated 13 and an adhesive assembly collectively designated 26. This adhesive assembly includes the reservoir 29 situated between the framework 10 and supported by members 57, it being understood that the adhesive assembly 26 is stationary in this embodiment although, of course, a movable type as hereinbefore described could be utilized without limiting the scope of the present invention.

An adhesive carrying roller 31 is journalled upon spindle 41 within the reservoir 29, the roller passing through the adhesive within the reservoir as hereinbefore described.

A gear 58 is secured to the spindle on one end thereof and this gear is engaged by a smaller gear 59 which in turn may be driven by a source of power 60 contained within the framework.

The platen assembly 13 is similar to that described previously and shown in detail in FIGS. 5, 6 and 7. In this embodiment, spindles or shafts 61 extend from each side of the platen assembly and carry rollers 62 journalled for rotation thereon, said rollers engaging within the channel guides 63 supported upon members 11 so that the platen assembly can roll along the channel guides 63 as will hereinafter become apparent.

A supporting rod 64 is situated parallel to one of the members 11 and is supported thereon by means of arms 65. Sheave bearings 66 extend from one side of the platen assembly and engage over rod 64 so that the platen assembly can move along the channel guides 63 and along rod 64.

The mounting of the sheave bearing 66 upon rod 64 enables the platen assembly to be pivoted upwardly to the position shown in FIG. 8, said position being identified by the term "frost shield exposed position."

A weight 67 extending outwardly from the sheave bearing 66 counter-balances the weight of the platen assembly 13 and facilitates the raising and lowering of same. A relatively short length of rack bar 68 is secured to one side 69 of the platen assembly opposite to the sheave bearing 66 and when the platen is in the position shown in FIG. 8 this rack bar engages gear 58 which, of course, will move the platen assembly across the roller, it being understood that the gear connection between gear 58 and the rack bar is such that synchronization of surface speed of the roller is obtained with lineal movement of the frost shield carried by the platen assembly.

In the claims, the position of the platen assembly shown in solid line in FIG. 8 is referred to as the "adhesive applying position."

When in the raised position shown in phantom in FIG. 8, the platen assembly registers with or rests upon a platen storage assembly collectively designated 70. This includes triangular supporting structure 71 extending upwardly from the supporting structure 10 and having a pair of spaced and parallel angle iron members 73 supported by the triangular members 71. The rollers 62 engage these angle iron members which act as tracks and permit the platen assembly to be moved manually along the rod 64 for positioning purposes.

It will therefore be appreciated that several platen assemblies can be utilized mounted upon rod 64 and that as the frost shields are formed thereon, they may be lowered into position, the rack bar 68 engaged with gears 58 which then moves them across the adhesive carrying roller 33 to the other end of the machine where they can be elevated to the raised position for dismounting of the coated frost shield.

The embodiment shown in FIG. 8 preferably includes the radiant heating element 49 so that the frost shield can be formed by the vacuum connection when in the raised position shown in phantom and it can then be lowered to the adhesive applying position, the vacuum maintaining the frost shield in position.

It should be stressed that in all embodiments, the gearing connection between the adhesive carrying roller and the rack bars should be such that the peripheral speed of the roller should equal, or be close to, the lineal speed of the carriage.

Various modifications can be made within the scope of the inventive concept disclosed. Accordingly, it is intended that what is described herein should be regarded as illustrative of such concept and not for the purpose of limiting protection to any particular embodiment thereof, but that only such limitations should be placed upon the scope of protection to which the inventor hereof is entitled, as justice dictates.

What I claim as my invention is:

1. A device for coating the perimetrical edges of a frost shield with an adhesive comprising in combination supporting framework, an adhesive carrying roller journalled for rotation in said framework, a vacuum operated platen to hold said shield in position also mounted on said framework, and means coacting between said platen and said roller with interfacial movement therebetween, and means to synchronize the surface speed of said roller with the relative lineal speed of said platen, said means to synchronize the surface speed of said roller with the lineal speed of said platen including a sub frame, a shaft rotatably supporting said roller in said sub frame, an adhesive reservoir below said roller, anti-friction rollers supporting said sub frame for synchronized movement along said supporting framework, a gear secured to said shaft, and a longitudinally extending rack bar supported by said supporting framework and engageable by said gear, and means to move said sub frame endwise along said supporting framework whereby said roller rolls across the surface of the associated frost shield held by said platen.

2. A device for coating the perimetrical edges of a frost shield with an adhesive comprising in combination supporting framework, an adhesive carrying roller journalled for rotation in said framework, a vacuum operated platen to hold said shield in position also mounted on said framework, the means coacting between said platen and said roller with interfacial movement therebetween, and means to synchronize the surface speed of said roller with the lineal speed of said platen, a shaft rotatably supporting said adhesive carrying roller in said supporting framework, a reservoir under said roller, a gear rotatable with said roller on one end thereof, means mounting said platen for longitudinal sliding movement along said supporting framework, means to move said platen along said supporting framework and a rack bar secured to said platen and selectively engageable with said gear to rotate said adhesive carrying roller, and a source of power selectively rotating said adhesive carrying roller when said rack bar is disengaged from said gear, and means coacting between said platen and said source of power to disengage said source of power from said roller when said rack bar engages said gear and to engage said source of power to said roller when said rack bar disengages from said gear.

3. The device according to claim 2 in which said means mounting said platen for longitudinal sliding movement along said supporting framework includes further means mounting said platen for pivotal movement from an adhesive applying position to a raised, frost shield exposed position, said last means including a longitudinally extending rod supported by said framework and a sheave bearing mounting said platen by one side thereof onto said rod, and a longitudinally extending platen storage assembly to receive and support said platen when in the frost shield exposed position, said platen being manually movable along said rod when in the said frost shield exposed position.

4. A device for coating the perimetrical edges of a frost shield with an adhesive comprising in combination supporting framework, an adhesive carrying roller journalled for rotation in said framework, a vacuum operated platen to hold said shield in position also mounted on said framework, the means coacting between said platen and said roller with interfacial movement therebetween, and means to synchronize the surface speed of said roller with the lineal speed of said platen, a shaft rotatably supporting said adhesive carrying roller in said supporting framework, a reservoir under said roller, a gear rotatable with said roller on one end thereof, means mounting said platen for longitudinal sliding movement along said supporting framework, means to move said platen along said supporting framework and a rack bar secured to said platen and selectively engageable with said gear to rotate said adhesive carrying roller, said means mounting said platen for longitudinal sliding movement along said supporting framework includes further means mounting said platen for pivotal movement from an adhesive applying position to a raised, frost shield exposed position, said last means including a longitudinally extending rod supported by said framework and a sheave bearing mounting said platen by one side thereof onto said rod, and a longitudinally extending platen storage assembly to receive and support said platen when in the frost shield exposed position, said platen being manually movable along said rod when in the said frost shield exposed position.

References Cited

UNITED STATES PATENTS

| | | | |
|---|---|---|---|
| 1,200,272 | 10/1916 | Taylor | 118—223 XR |
| 2,324,486 | 7/1943 | Clausen | 118—242 XR |

WILLIAM I. PRICE, Primary Examiner

R. I. SMITH, Assistant Examiner

U.S. Cl. X.R.

118—240, 242